United States Patent
Gardiner et al.

[11] 3,808,769
[45] May 7, 1974

[54] LIQUID CRYSTAL DEVICE CLOSURE METHOD

[75] Inventors: Arthur Noel Gardiner; Herman Abraham Stern, both of Somerville, N.J.

[73] Assignee: RCA Corporation, New York, N.Y.

[22] Filed: Sept. 5, 1972

[21] Appl. No.: 286,250

[52] U.S. Cl. ............... 53/43, 29/522, 350/160 LC
[51] Int. Cl. ........ B65b 7/28, B67b 1/04, B67b 5/02
[58] Field of Search ........ 29/522, 526 R; 53/43, 42; 350/160 LC

[56] References Cited
UNITED STATES PATENTS

| | | | |
|---|---|---|---|
| 1,773,855 | 8/1930 | Peters | 29/522 |
| 2,752,693 | 7/1956 | Wullschleger | 29/522 X |
| 3,001,279 | 9/1961 | Sherrill | 29/526 R UX |
| 3,362,129 | 1/1968 | Scherer et al. | 53/43 |
| 3,522,648 | 8/1970 | Weber | 29/522 |
| 3,584,101 | 6/1971 | Martz | 29/522 X |
| 3,701,368 | 10/1972 | Stern | 350/160 LC UX |

*Primary Examiner*—Charlie T. Moon

[57] ABSTRACT

A method of closing a liquid crystal device after filling its substrate interspace with the liquid crystal material through a hole in one of the substrates, comprising introducing a particle of malleable, non-reactive material into the hole and then shaping the particle to conform with the peripheral surface of the hole. The particle may be made of a soft metal such as lead and shaped by forcing a swage thereagainst. The resultant plug hermetically seals the hole without increasing the thickness of the device.

10 Claims, 4 Drawing Figures

LIQUID CRYSTAL DEVICE CLOSURE METHOD

BACKGROUND OF THE INVENTION

This invention relates to a novel closure method for a liquid crystal device.

A typical liquid crystal device comprises a pair of spaced-apart, hermetically-sealed substrates and a liquid crystal material therebetween. Each substrate has an electrode on the inner surface thereof for applying an electric field across the liquid crystal material. With no field applied, the liquid crystal material is transparent; however, when a field is applied, the material becomes a forward-scatterer of light. By suitable electrode design, the device can be employed in any one of various types of displays.

The general method of fabricating the liquid crystal device described above comprises assembling the substrates in spaced-apart relationship, hermetically sealing the substrates at or near the edges thereof, pouring the liquid crystal material into the substrate interspace through a hole in one of the substrates, and then hermetically sealing or closing the hole. Usually, two holes are provided in the same substrate and metal tubulations are sealed thereto. One of the tubulations is connected to a source of liquid crystal material, while the other tubulation is connected to a source of vacuum. The space between the substrates is thereby filled completely with the liquid crystal material. Both holes are then closed by "pinching off" each of the tubulations near the substrate surface.

A major disadvantage of the closure method described above is that the pinching-off step, typically including capping of the pinched-off tubulations, increases the thickness of the liquid crystal device. This increased thickness is a problem particularly with devices designed for liquid crystal watch displays. Also, device fabrication is complicated by the need for permanently sealing the metal tubulations to one of the substrates. The tubulation seals often leak and thereby become sources of device failure.

SUMMARY OF THE INVENTION

The novel method of closing a liquid crystal device comprising a pair of spaced-apart, hermetically-sealed substrates and a liquid crystal material therebetween, one of the substrates having a hole therethrough communicating with the substrate interspace, comprises the steps of introducing a particle of malleable material into the hole, the malleable material being non-reactive with the liquid crystal material; and then shaping the particle to conform with the peripheral surface of the hole. Preferably, the malleable material is a soft metal such as lead, and the particle is shaped by forcing a swage thereagainst. The swaging force is preferably applied with both a normal motion and a rotational motion.

Introducing a particle of malleable material into the hole provides a means for plugging the hole which is independent of the means for filling the substrate interspace with the liquid crystal material, thereby eliminating the need for permanently attaching tubulations to one of the substrates. Soft metals such as lead are readily-available, inexpensive sources for the particle material. Shaping the particle to conform with the peripheral surface of the hole produces a plug which hermetically seals the hole without necessarily increasing the thickness of the liquid crystal device; and shaping by swaging assures that the plug can be so produced in a controlled, reproducible manner. Adding a rotational motion to the swaging force serves to break any static friction between the particle and the peripheral surface of the hole, preventing failure of the closure. The novel method has been successfully employed in the fabrication of various liquid crystal display devices.

DESCRIPTION OF THE PREFERRED EMBODIMENTS

Figure 1:
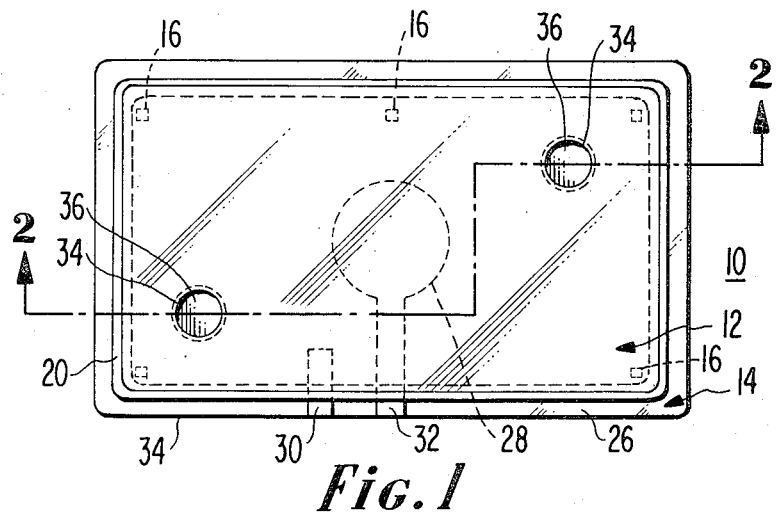
FIG. 1 is a top view of a liquid crystal device closed according to the novel method.
Figure 2:
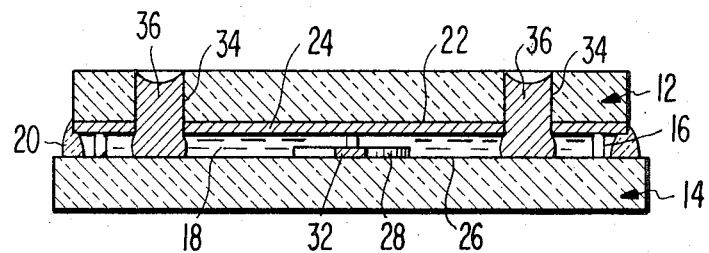
FIG. 2 is a sectional view, along the line 2—2, of the device of FIG. 1.

The following is an example of the novel closure method. As shown in FIGS. 1 and 2, a liquid crystal display device 10 comprises a first transparent-glass substrate 12 and a second transparent-glass substrate 14. The substrates 12 and 14 are maintained in spaced-apart relationship by means of a plurality of mica spacers 16 disposed inwardly of the edges of the substrates. Typically, the spacers 16 are each about 40 mils × 40 mils square and approximately 0.5 mil thick. The substrates 12 and 14 are each about 40 mils thick. Sandwiched between the substrates 12 and 14 is a liquid crystal material 18 which may be any one of the various known types. The liquid crystal material 18 is retained within the substrate interspace by a hermetic glass-frit seal 20 disposed between the substrates 12 and 14, along the edges thereof.

The substrates are generally rectangular in shape, the second substrate 14 being slightly larger than, i.e., overlapping, the first substrate 12. The inner surface 22 of the first substrate 12 is coated with a first electrode 24, which may be made of either a transparent or a reflective material, depending upon the desired mode of operation of the device 10. Disposed on the inner surface 26 of the second substrate 14 is a second electrode 28, made of a transparent material and patterned in a shape to be displayed. For illustrative purposes, the second electrode 28 is shown to be circular in shape. Also disposed on the inner surface 26 of the second substrate 14 are first and second conducting paths, 30 and 32, respectively, also made of a transparent material. The first path 30 extends from the edge portion 34 of the second substrate 14 to a metal tab (not shown), which bridges the substrate interspace and is in direct contact with the first electrode 24. The second path 32, in turn, extends from the edge portion 34 to the second electrode 26. The first and second paths 30 and 32, respectively, thus serve as the means for applying an electric field (not shown) between the first and second electrodes 24 and 28, respectively. Typically, the transparent material of the electrodes and conducting path is indium oxide, and the reflective material is aluminum.

For purposes of fabrication of the device 10, as discussed below, the first substrate 12 has two diagonally opposed cylindrical holes 34 through the thickness thereof. Typically, the holes 34 are each about 35 mils in diameter and located near the edge of the first substrate 12. Also, the holes 34 may be adjacent to the spacers 16, exterior thereto, or interior thereto (as shown in FIGS. 1 and 2). Each hole 34 is hermetically closed by a lead plug 36 extending through the hole to the inner surface 26 of the second substrate 14. The plugs 36 are shaped to conform with the peripheral surfaces of their respective holes 34 and are somewhat bulbous within the substrate interspace.

Figure 3:
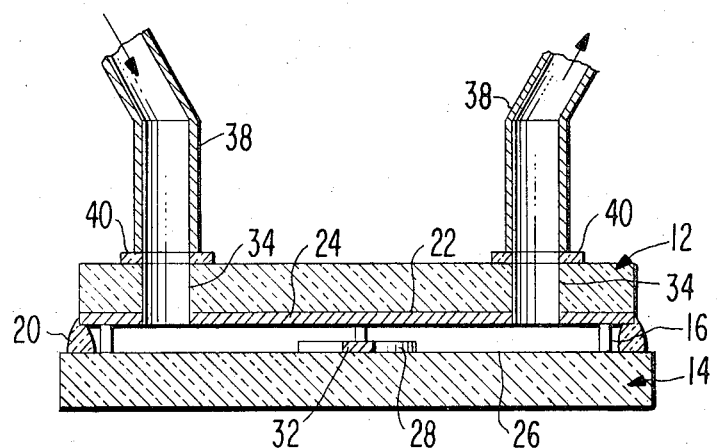
FIG. 3 is a sectional view of the device of FIG. 1, prior to the closing thereof.

The method of fabricating the device 10 comprises assembling the first and second substrates 12 and 14, respectively, in spaced-apart relationship by means of the mica spacers 16. At this step, the holes 34 through the first substrate 12 are already formed, but not yet plugged. Next, the substrates are hermetically sealed along the edges thereof, to produce the seal 20, using well-known glass-frit sealing techniques. Then the substrate interspace is filled with the liquid crystal material 18 by employing a pair of metal tubulations 38 in communication with the unplugged holes 34, as shown in FIG. 3. Each tubulation 38 is provided with a rubber gasket 40 at one end thereof for forming a liquid-tight seal with the first substrate 12. The other or remote ends (not shown) of the tubulations 38 are then connected one to a source of the liquid crystal material 18 and the other to a source of vacuum (both sources also not shown). Simultaneous operation of the two sources facilitates complete filling of the substrate interspace, as well as the holes 34, with liquid crystal material. Following the filling steps, the tubulations 38 and gaskets 40 are removed from the first substrate 12.

The device 10 is then closed by first introducing into each hole 34 a particle of lead, typically in the form of a sphere (not shown as such) having a diameter of about 30 mils. The lead particles fall to the bottoms of their respective holes 34 and rest on the inner surface 26 of the second substrate 14. Next, a swage (not shown) is manually forced against each of the lead particles to conform them with the peripheral surfaces of their respective holes 34. The swage is usually in the form of a solid cylindrical rod having a domed end which contacts each of the lead particles, the diameter of the rod being only 2–3 mils smaller than that of the holes 34. The force is applied with both a downward or normal motion and also a slight twisting or rotational motion, which causes the material of each particle to cold-flow to the peripheral surface of its respective hole 34. Small amounts of particle material also flow into the substrate interspace regions adjacent to the holes 34, but the effective wedging action between the narrowly separated substrates 12 and 14 is negligible. The rotational motion of the swaging force serves to break any static friction between the lead particles and the peripheral surfaces of the holes 34. The lead particles are thereby shaped into the form of the lead plugs 36, effecting the required cold closure of the device 10.

Figure 4:
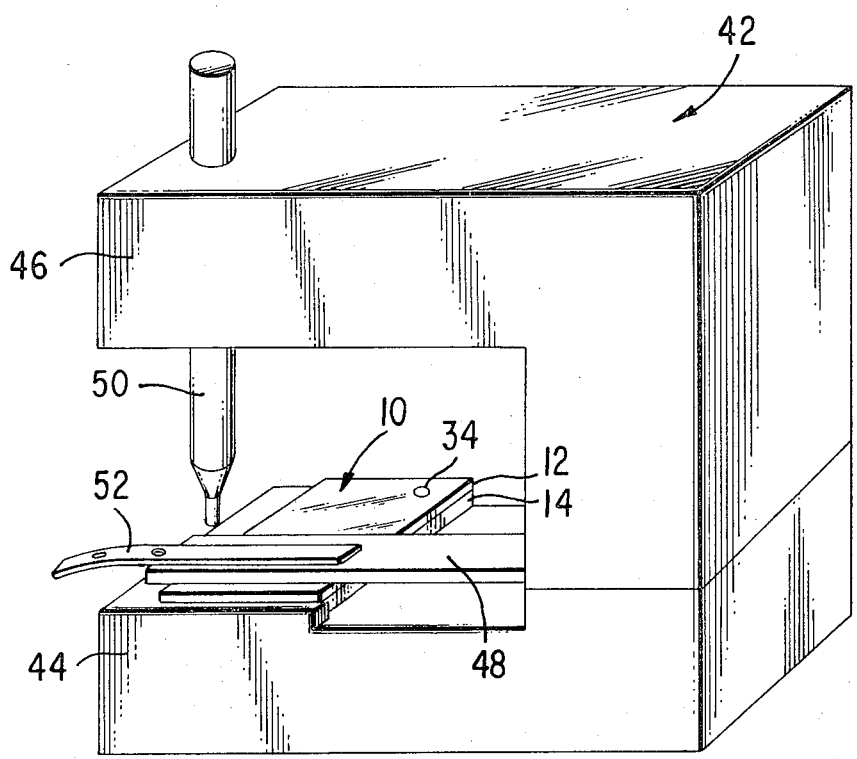
FIG. 4 is a perspective view of apparatus for practicing the novel method.

Another example of the novel method is illustrated in FIG. 4, which depicts apparatus 42 suitable for automatically closing the device 10. The apparatus 42 comprises lower and upper die shoes 44 and 46, respectively, between which is disposed a die 48 having a cylindrical hole (not shown) therethrough. The lower shoe 44 supports the liquid crystal-filled device 10 such that one of the holes 34 in the first substrate 12 is axially aligned with, and immediately below, the hole in the die 48. The diameter of the die hole is approximately equal to that of the substrate holes 34. Located above the die hole, and also axially aligned therewith, is a combination punch-and-swage 50. The punch-and-swage 50 is mounted through the upper shoe 46, in sliding relationship therewith, to facilitate its translational movement relative to the die hole. Disposed directly on the die 48, and covering the hole therethrough, is a thin sheet or foil 52 of lead. The thickness of the lead foil 52 is about 30 mils.

The substrate hole 34 in alignment with the die hole is sealed by applying a downward force to the punch-and-swage 50, such that a disc-like particle (not shown) is first punched out of the lead foil 52, then introduced into the hole 34, and finally shaped to conform with the peripheral surface of the hole 34. As in the example above, the force may also be applied with a slight twisting motion to break any static friction between the lead disc and the peripheral surface of the aligned substrate hole 34. The remaining substrate hole 34 is sealed in the same manner, after it is brought into axial alignment with, and an unpunched section of the lead foil 52 is moved over, the die hole. The movements of the punch-and-swage 50, device 10, and lead foil 52 may each be manually or automatically-controlled, the latter by well-known means (not shown) normally employed in the mechanical arts. Also, more than one device 10 can be closed automatically.

GENERAL CONSIDERATIONS

It should be understood that the invention is not limited to the examples described above. Thus, the substrate and electrode geometries may be other than those shown in FIGS. 1 to 4. See, for example, U.S. Pat. No. 3,612,654, issued on Oct. 12, 1971, to R. I. Klein et al. The particles which are first introduced into the substrate holes may be irregular, as well as spherical or disc-like, in form. Also, a plurality of particles may be introduced into a single substrate hole to produce a plug therefor, but a greater exercise of care may be required to prevent leakage of the closure. Further, the particles may be made of a malleable material other than lead, such as copper, gold, indium, or an alloy thereof. However, solders bearing a flux which can react with the liquid crystal material should not be employed; such materials usually have the further disadvantage of requiring a heating step in a closure process.

What is claimed is:

1. In the fabrication of a liquid crystal device comprising a pair of spaced-apart, hermetically-sealed substrates and a liquid crystal material therebetween, one of said substrates having a hole therethrough communicating with the substrate interspace, the method of closing said device comprising the steps of:
    a. introducing a particle of malleable material into said hole and in contact with the surface of the other of said substrates opposite said hole, said malleable material being nonreactive with said liquid crystal material; and
    b. plastically deforming said particle in said hole to comform said particle with the peripheral surface of said hole.

2. The method of claim 1, wherein said malleable material is selected from the group consisting of lead, copper, gold, indium, and alloys thereof.

3. The method of claim 1, wherein said particle is shaped by swaging.

4. In the fabrication of a liquid crystal device comprising a pair of spaced-apart, hermetically-sealed substrates and a liquid crystal material therebetween, one of said substrates having at least one cylindrical hole therethrough communicating with the substrate interspace, the method of closing said device comprising the steps of:
 a. introducing a particle of malleable metal into said hole, and in contact with the surface of the other of said substrates opposite said hole, said malleable metal being non-reactive with said liquid crystal material; and
 b. forcing a swage thereagainst to conform said particle with the peripheral surface of said hole and to enlarge the portion of said particle in said interspace to a somewhat bulbous configuration.

5. The method of claim 4, wherein said malleable metal is lead.

6. The method of claim 4, wherein said particle is spherical in form.

7. The method of claim 4, wherein said particle is disc-like in form.

8. The method of claim 4, wherein said swage comprises a cylindrical rod having a domed end.

9. The method of claim 4, wherein said swaging force is applied in both normal and rotational directions.

10. In the fabrication of a liquid crystal device comprising a pair of spaced-apart, hermetically-sealed substrates and a liquid crystal material therebetween, one of said substrates having two cylindrical holes therethrough communicating with the substrate interspace, the method of closing said device comprising the steps of:
 a. introducing a particle of lead into each of said holes and in contact with the surface of the other of said substrates opposite said hole, and
 b. forcing a swage thereagainst to conform each particle with the peripheral surface of its containing hole and to enlarge the portion of each said particle in said interspace to a somewhat bulbous configuration.

* * * * *